Sept. 20, 1955     G. H. HERRICK     2,718,604
COLLECTOR RING ASSEMBLY
Original Filed Aug. 20, 1951
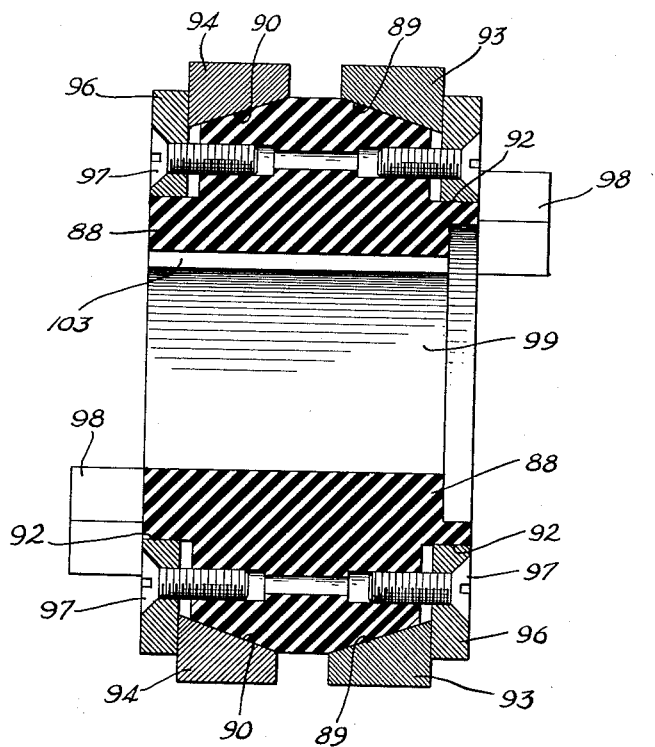
INVENTOR.
GEORGE H. HERRICK
BY
Paul L. Keohu
ATTY.

United States Patent Office 2,718,604
Patented Sept. 20, 1955

2,718,604

COLLECTOR RING ASSEMBLY

George H. Herrick, Beloit, Wis., assignor to Fairbanks, Morse & Co., Chicago, Ill., a corporation of Illinois Original application August 20, 1951, Serial No. 242,646. Divided and this application February 23, 1954, Serial No. 411,788

2 Claims. (Cl. 310—232)

This invention relates to improvements in slip ring or collector ring means for electrical machines, and is concerned more particularly with a slip or collector ring unit of improved form and construction, suitable for application to the rotating member of an electrical machine as a generator, alternator or the like. The instant application is a division of my co-pending application for improvements in Axial Air Gap Generator, filed August 20, 1951 and bearing Serial No. 242,646.

The improvements effected in accordance with the present invention, including a marked simplification of collector ring structure and improved facility of assembly of the parts thereof, will appear readily from the following description of a preferred embodiment of the invention as illustrated by the accompanying drawing, the single figure of which presents a longitudinal sectional view of the assembled collector ring unit.

Referring to the drawing, the presently improved collector ring unit comprises a shaft mounting hub member 88 of insulating material and formed to provide oppositely beveled or tapered peripheral surface portions or seats 89 and 90, one adjacent each end of the hub. Each hub end is reduced below the adjacent peripheral seat, to provide an annular seat 92. An internally tapered collector ring 93 of conducting material, is mounted on the tapered hub surface 89, while a like collector ring 94 is engaged on the tapered seat 90 of the hub. Mounted on each hub seat 92 in abutment with the adjacent collector ring, is a retainer or clamping ring 96 of conducting material. The latter rings are secured to the hub through suitable screws 97 which when drawn up, effect through the clamping rings a firm wedge seating of the associated collector ring on the hub. For circuit connection to the collector rings, each of the clamping rings 96 has secured thereto a terminal element 98.

The shaft-receiving bore 99 of the collector ring body or hub 88 is provided with a longitudinal slot or key-way 103 for the usual key element (not shown) serving to secure the collector ring unit in driven relation to a shaft (not shown), as the rotor shaft of an electrical machine (not shown) with which the collector ring unit is to be utilized. In collector ring use, suitable collector brushes (not shown) will be in frictional engagement with the peripheral surface of the collector rings 93 and 94.

It now will be observed from the foregoing that the present collector ring unit is constructed of but few parts and is adapted for ready assembly of the parts, including wedge seating of the collector ring elements on the tapered seats of the hub part of the unit, by clamping rings which serve in addition, as conductor elements between the lead terminals 98 and the collector ring elements.

What I claim and desire to secure by Letters Patent is:

1. A rotary current collector assembly for electrical machines, comprising a shaft mounting hub member of insulating material formed to provide a tapered peripheral surface portion adjacent one side of the member and an oppositely tapered peripheral surface portion adjacent the other side of the member, said hub member further being formed to provide a cylindrical seat at each side thereof, internally tapered collector ring elements on the tapered surface portions of the hub member, retainer rings on said cylindrical seats of the hub member each in engagement with one of the collector ring elements to retain the latter in wedge-seating engagement with the underlying tapered surface of the hub member, said retainer rings being formed of conducting material, and a terminal element on each retainer ring.

2. A rotary current collector unit for electrical machines, comprising a cylindrical shaft mounting hub member of insulating material, formed to provide a tapered peripheral surface portion inwardly adjacent each side of the hub member and a cylindrical seat at each side of the member, internally tapered collector ring elements on the tapered surface portions of the hub member, retainer rings disposed on said cylindrical seats at the sides of the hub member with each retainer element in overlapping abutment with the outer side of the adjacent collector ring element, means securing each retainer element to the hub member and effective through the retainer element in its said overlying abutment with the adjacent collector ring element, to determine wedge-seating engagement of the ring element with the underlying tapered surface of the hub member, said retainer rings being formed of conducting material, and a terminal element on each retainer ring.

References Cited in the file of this patent

UNITED STATES PATENTS

| 970,786 | Brown | Sept. 20, 1910 |
| 1,431,295 | Evans | Oct. 10, 1922 |